United States Patent
Chang et al.

(10) Patent No.: US 10,577,465 B2
(45) Date of Patent: Mar. 3, 2020

(54) SILICON POLYMER PRODUCTION METHOD USING NON-TRANSITION-METAL-CATALYST METHOD OF HYDROSILYLATION

(71) Applicants: INSTITUTE FOR BASIC SCIENCE, Daejeon (KR); KOREA ADVANCED INSTITUTE OF SCIENCE AND TECHNOLOGY, Daejeon (KR)

(72) Inventors: Sukbok Chang, Daejeon (KR); Seewon Joung, Daejeon (KR); Dongwook Kim, Daejeon (KR); Jeung Gon Kim, Daejeon (KR)

(73) Assignees: INSTITUTE FOR BASIC SCIENCE, Daejeon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/760,135

(22) PCT Filed: Sep. 12, 2016

(86) PCT No.: PCT/KR2016/010227
§ 371 (c)(1),
(2) Date: Mar. 14, 2018

(87) PCT Pub. No.: WO2017/048003
PCT Pub. Date: Mar. 23, 2017

(65) Prior Publication Data
US 2018/0251605 A1  Sep. 6, 2018

(30) Foreign Application Priority Data
Sep. 14, 2015 (KR) .......... 10-2015-0129598

(51) Int. Cl.
*C08G 77/08* (2006.01)
*C08G 77/50* (2006.01)
*C08G 77/52* (2006.01)

(52) U.S. Cl.
CPC .......... *C08G 77/08* (2013.01); *C08G 77/50* (2013.01); *C08G 77/52* (2013.01)

(58) Field of Classification Search
CPC .................................................. B01J 21/02
See application file for complete search history.

(56) References Cited

U.S. PATENT DOCUMENTS 3,658,866 A * 4/1972 Tsuji et al. ............ B01J 31/185
556/479
2010/0137454 A1 6/2010 Barmes et al.

FOREIGN PATENT DOCUMENTS

| JP | 05 105759 | * | 4/1993 |
| JP | 2010090007 | * | 4/2010 |
| JP | 2013-221134 A | | 10/2013 |
| JP | 2015-155387 A | | 8/2015 |
| KR | 10-2011-0006125 A | | 1/2011 |
| KR | 10-2014-0035318 A | | 3/2014 |
| KR | 10-2014-0041578 A | | 4/2014 |

OTHER PUBLICATIONS

JP 2010 090007 machine translation (2010).*
JP 05 105759 machine translation (1993).*
International Search Report for PCT/KR2016/010227 dated Dec. 19, 2016.
Rubin et al., "Highly Efficient B(C6F5)3-Catalyzed Hydrosilylation of Olefins," The Journal of Organic Chemistry, 2002, vol. 67, pp. 1936-1940.
KIPO Notice of Decision to Grant Patent Application for Korean Application No. 10-2015-0129598 dated Mar. 31, 2017.
KIPO Notice of Preliminary Rejection for Korean Application No. 10-2015-0129598 dated Oct. 10, 2016.

* cited by examiner

*Primary Examiner* — Kuo Liang Peng
(74) *Attorney, Agent, or Firm* — Hauptman Ham, LLP

(57) ABSTRACT

The present invention relates to a silicon polymer production method using a non-transition-metal-catalyst method of hydrosilylation, and more specifically relates to a production method for a silicon polymer using a non-transition-metal-catalyst method of hydrosilylation, wherein an environmentally friendly silicon polymer is produced by using hydrosilylation using a non-transition metal as a catalyst, thereby avoiding the use of platinum, palladium and rhodium or other expensive platinum group catalysts and so achieving outstanding economic viability and making it possible to prevent residues of heavy metals.

8 Claims, 2 Drawing Sheets

SILICON POLYMER PRODUCTION METHOD USING NON-TRANSITION-METAL-CATALYST METHOD OF HYDROSILYLATION

CROSS REFERENCE TO RELATED APPLICATION

This present application is a national stage filing under 35 U.S.C § 371 of PCT application number PCT/KR2016/010227 filed on Sep. 12, 2016 which is based upon and claims the benefit of priority to Korean Patent Application No. 10-2015-0129598 filed on Sep. 14, 2015 in the Korean Intellectual Property Office. The disclosures of the above-listed applications are hereby incorporated by reference herein in their entirety.

TECHNICAL FIELD

The present invention relates to a method for preparing a silicon polymer using a non-transition-metal-catalyst method of hydrosilylation, and more specifically, to a method for preparing a silicon polymer using a non-transition-metal-catalyst method of hydrosilylation, wherein an environmentally friendly silicon polymer is prepared using hydrosilylation by using a non-transition metal as a catalyst so that the method is economically feasible because expensive platinum group catalysts such as platinum, palladium, rhodium, etc. are not used and is capable of preventing residues of heavy metal.

BACKGROUND ART

Generally, hydrosilylation involving reactions between silyl hydride and unsaturated organic groups is used not only for various addition-cured products such as sealants, adhesives, and silicon-based coating products, but also is the basic principle in the synthesis process for producing commercial silicon products such as silicon surfactants, silicone oil, and silane. Up until now, in general, hydrosilylation has been accelerated by noble metal catalysts such as platinum or rhodium metal complexes.

For example, platinum-based hydrosilylation catalysts include Ashby's catalyst, Lamoreaux's catalyst, Karstedt's catalyst, Speier's catalyst, etc. However, although these noble metal complex catalysts have been widely recognized as catalysts for hydrosilylation, they have a few disadvantages.

The Korean Laid-Open Patent Publication No. 10-2014-0041578 (Patent Document 1) discloses a hydrosilylation catalyst including a platinum-ligand complex, a hydrosilylation curable composition including an aliphatic unsaturated compound, and the preparation method and the use method thereof. When these expensive noble metal catalysts are used, they account for a significant part of the cost for silicon formulations. Recently, global demand for precious metals including platinum has increased, and as a result, effective and inexpensive replacement catalysts are needed.

As an alternative to precious metals, recently, several iron complexes have attracted attention for use as hydrosilylation catalysts. For example, technical journal papers have disclosed that Fe(CO)$_5$ catalyzes hydrosilylation at high temperatures (C. Randolph, M. S. Wrighton, *J. Am. Chem. Soc.* 108(1986)3366). However, there remains a problem in that undesirable side products such as unsaturated silyl olefin, which is a product of dehydrogenative silylation, are also produced.

In addition, the Korean Laid-Open Patent Publication No. 10-2014-0035318 (Patent Document 2) discloses metal-catalyst mono hydrosilylation of poly unsaturated compounds by selectively using non-noble metal pyridine and terpyridine complexes as catalysts for hydrosilylation.

However, these non-noble metal-based complex catalysts still have problems in that it is difficult to remove heavy metals remaining in the resin because these catalysts contain heavy metals.

Therefore, a method for preparing a hydrosilylation catalyst and a silicon polymer, which improve economic feasibility and do not require removal of residual heavy metals while maintaining a high yield and reactivity in place of conventional expensive noble metal catalysts, is needed.

[Patent Document 1] Korean Laid-Open Patent Publication No. 10-2014-0041578

[Patent Document 2] Korean Laid-Open Patent Publication No. 10-2014-0035318

DISCLOSURE

Technical Problem

In order to solve the above problems, an object of the present invention is to provide a method for preparing a silicon polymer using hydrosilylation, wherein a non-transition metal is used to prepare a silicon polymer via hydrosilylation, and therefore, the method is economically feasible because conventional expensive platinum group catalysts such as platinum, palladium, rhodium, etc. are not used, which is capable of preventing residues of heavy metals.

In addition, another object of the present invention is to provide an environmentally friendly silicon polymer prepared according to the above method.

Technical Solution

To achieve the above objects, the present invention relates to a method for preparing an environmentally friendly silicon polymer, wherein a divinyl compound and a dihydrosilane compound are subjected to hydrosilylation under the presence of an organoboron catalyst.

According to an embodiment of the present invention, the divinyl compound may be represented by Chemical Formula 1 below, but not limited thereto.

[Chemical Formula 1]

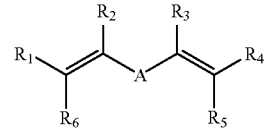

(in Chemical Formula 1 above, $R_1$ to $R_6$ are each independently selected from hydrogen and (C1-C10) alkyl, the A is selected from a chemical bond, oxygen, sulfur, carbonyl, (C1-C20) alkylene, (C2-C20) alkenylene, (C3-C20) cycloalkylene, (C6-C20) arylene, (C3-C20) heterocycloalkylene, (C4-C20) heteroarylene, and $(R_2SiO)_n$, the Rs are each independently selected from hydrogen or (C1-C10) alkyl, p is selected from 10 to 10,000, and the alkyl, alkylene, alkenylene, cycloalkylene, arylene, heterocycloalkylene, and heteroarylene are substitutable with at least one selected from among (C1-C7) alkyl, halogen, nitro, cyano, hydroxyl, amino, (C6-C20) aryl, (C2-C7) alkenyl, (C3-C20) cycloalkyl, (C3-C20) heterocycloalkyl, and (C4-C20) heteroaryl).

According to an embodiment of the present invention, the divinyl compound may be represented by Chemical Formula 2 below.

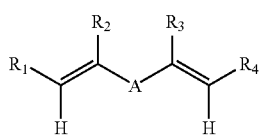

[Chemical Formula 2]

(in Chemical Formula 2 above, $R_1$, $R_2$, $R_3$ and $R_4$ are each independently selected from hydrogen and (C1-C5) alkyl, the A is selected from (C1-C10) alkylene, (C2-C10) alkenylene, (C3-C10) cycloalkylene, (C6-C10) arylene, and $(R_2SiO)_p$, the Rs are each independently selected from hydrogen or (C1-C10) alkyl, p is selected from 10 to 10,000, and the alkyl, alkylene, alkenylene, and cycloalkylene, and arylene are substitutable with at least one selected from among (C1-C7) alkyl, halogen, nitro, cyano, hydroxy, amino, (C6-C20) aryl, (C2-C7) alkenyl, and (C3-C20) cycloalkyl).

According to an embodiment of the present invention, the dihydrosilane compound may be represented by Chemical Formula 3 below.

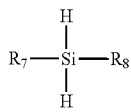

[Chemical Formula 3]

(in Chemical Formula 3 above, $R_7$ and $R_8$ are each independently selected from hydrogen and (C1-C10) alkyl, (C3-C20) cycloalkyl, (C6-C20) aryl, (C3-C20) heterocycloalkyl, (C4-C20) heteroaryl, —$OR_9$, —$N(R_{10})(R_{11})$, —$P(R_{12})(R_{13})(R_{14})$, and -D-Si$(R_{15})(R_{16})(R_{17})$, not simultaneously hydrogen, the D is selected from a chemical bond, oxygen, sulfur, (C1-C20) alkylene, (C2-C20) alkenylene, (C3-C20) cycloalkylene, (C6-C20) arylene, (C3-C20) heterocycloalkylene, and (C4-C20) heteroarylene, the $R_{15}$ to $R_{17}$ are each independently selected from among hydrogen, (C1-C10) alkyl, (C2-C20) alkenyl, (C3-C20) cycloalkyl, (C6-C20) aryl, (C3-C20) heterocycloalkyl, (C4-C20) heteroaryl, —$OR_{19}$, —$N(R_{20})(R_{21})$, and —$P(R_{22})(R_{23})(R_{24})$, the $R_9$ to $R_{14}$ and $R_{19}$ and $R_{24}$ are each independently hydrogen or (C1-C10) alkyl, and the alkylene, alkenylene, cycloalkylene, arylene, heterocycloalkylene and heteroarylene are substitutable with at least one selected from among (C1-C7) alkyl, halogen, nitro, cyano, hydroxy, amino, (C6-C20) aryl, (C2-C7) alkenyl, (C3-C20) cycloalkyl, (C3-C20) heterocycloalkyl and (C4-C20) heteroaryl).

According to an embodiment of the present invention, in Chemical Formula 3, $R_7$ and $R_8$ are each independently selected from hydrogen, (C1-C10) alkyl, —$OR_9$, —$N(R_{10})(R_{11})$, —$P(R_{12})(R_{13})(R_{14})$, and -D-Si$(R_{15})(R_{16})(R_{17})$, not simultaneously hydrogen, the D is selected from oxygen, (C1-C20) alkylene, (C2-C20) alkenylene, (C3-C20) cycloalkylene, and (C6-C20) arylene, the $R_{15}$ to $R_{17}$ are each independently selected from hydrogen, (C1-C10) alkyl, (C2-C20) alkenyl, (C3-C20) cycloalkyl, (C6-C20) aryl, (C3-C20) heterocycloalkyl, (C4-C20) heteroaryl, —$OR_{19}$—, —$N(R_{20})(R_{21})$, and —$P(R_{22})(R_{23})(R_{24})$, the $R_9$ to $R_{14}$ and the $R_{19}$ to $R_{24}$ are each independently hydrogen or (C1-C5) alkyl, and the alkyl, alkylene, alkenylene, cycloalkylene, and arylene are substitutable with at least one selected from (C1-C7) alkyl, halogen, nitro, cyano, hydroxy, amino, (C6-C20) aryl, (C2-C7) alkenyl, and (C3-C20) cycloalkyl).

According to an embodiment of the present invention, an unsaturated group of the divinyl compound and a Si—H group of the dihydrosilane compound may be included at a molar ratio of 40:60 to 60:40.

According to an embodiment of the present invention, the organoboron catalyst may be included at 0.01 to 10 mol % based on the divinyl compound.

According to an embodiment of the present invention, the compound represented by Chemical Formula 4 below may be further included.

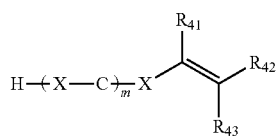

[Chemical Formula 4]

(in Chemical Formula 4 above, X is —Si$(R_{51})(R_{52})$—, the m is an integer selected from 0 to 100, the $R_{41}$ to $R_{43}$ and $R_{51}$ to $R_{52}$ are each independently selected from hydrogen, (C1-C10) alkyl, (C2-C20) alkenyl, (C3-C20) cycloalkyl, (C6-C20) aryl, (C3-C20) heterocycloalkyl, (C4-C20) heteroaryl, —$OR_{61}$, —$N(R_{62})(R_{63})$, and —$P(R_{64})(R_{65})(R_{66})$, not simultaneously hydrogen, the $R_{61}$ to $R_{66}$ are each independently hydrogen or (C1-C10) alkyl, the C is selected from a chemical bond, oxygen, sulfur, (C1-C20) alkylene, (C2-C20) alkenylene, (C3-C20) cycloalkylene, (C6-C20) arylene, (C3-C20) heterocycloalkylene, and (C4-C20) heteroarylene, and the alkyl, alkylene, alkenylene, cycloalkylene, and arylene are substitutable with at least one selected from (C1-C7) alkyl, halogen, nitro, cyano, hydroxy, amino, (C6-C20) aryl, (C2-C7) alkenyl, and (C3-C20) cycloalkyl.

According to an embodiment of the present invention, the organoboron catalyst may be represented by Chemical Formula 5 below, but not limited thereto.

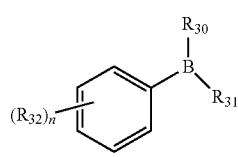

[Chemical Formula 5]

(in Chemical Formula 5 above, $R_{30}$ and $R_{31}$ are selected from halogen, (C1-C10) alkyl, (C3-C10) cycloalkyl, and (C6-C10) aryl, the $R_{32}$ is each independently selected from hydrogen, halogen, (C1-C10) alkyl, and (C6-C10) aryl, the alkyl, cycloalkyl, and aryl are substitutable with any one selected from (C1-C7) alkyl or halogen, and the n is an integer selected from 0 to 5, not simultaneously 0).

According to an embodiment of the present invention, the organoboron catalyst may be represented by Chemical Formula 6, but not limited thereto.

[Chemical Formula 6]

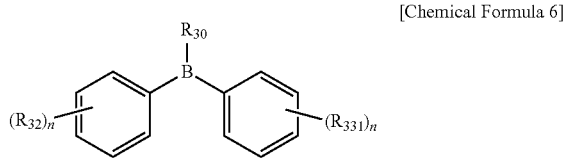

(in Chemical Formula 6, $R_{30}$ is selected from halogen, (C1-C10) alkyl, (C3-C10) cycloalkyl, and (C6-C10) aryl, the $R_{32}$ and $R_{331}$ are each independently selected from hydrogen, halogen, (C1-C10) alkyl, and (C6-C10) aryl, and the alkyl, cycloalkyl, and aryl are substitutable with at least one selected from (C1-C7) alkyl or halogen, and the n is an integer selected from 0 to 5, not simultaneously 0).

According to an embodiment of the present invention, the organoboron catalyst may be represented by Chemical Formula 7, but not limited thereto.

[Chemical Formula 7]

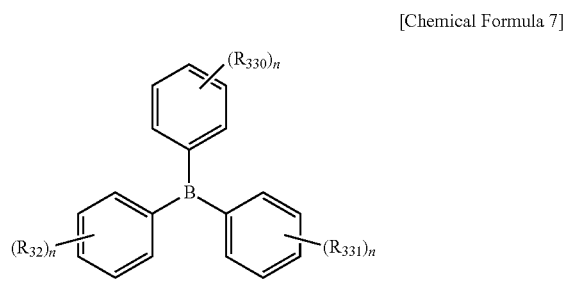

(in Chemical Formula 7 above, the $R_{32}$, $R_{330}$, and $R_{331}$ are each independently selected from hydrogen, halogen, (C1-C10) alkyl, and (C6-C10) aryl, the alkyl, cycloalkyl, and aryl are substitutable with any one selected from (C1-C7) alkyl or halogen, and the n is an integer selected from 0 to 5, not simultaneously 0).

According to an embodiment of the present invention, the preparation is not particularly limited, but may be mixing a catalyst solution including the organoboron catalyst, the dihydrosilane compound, and the divinyl compound, and reacting the same at 20 to 40° C. for 12 to 48 hours.

In addition, in order to achieve the above objects, the present invention relates to an environmentally friendly silicon polymer prepared according to the preparation method described above.

According to an embodiment of the present invention, the environmentally friendly silicon polymer may not include a platinum group catalyst and have number average molecular weight of, for example, 500 to 1,000,000 g/mol, but not limited thereto.

According to an embodiment of the present invention, the environmentally friendly silicon polymer further includes an additive selected from the group consisting of an antimicrobial agent, a heat stabilizer, an antioxidant, a release agent, a photostabilizer, an inorganic additive, a surfactant, a coupling agent, a plasticizer, a compatibilizer, a lubricant, an antistatic agent, a colorant, a pigment, a dye, a flame retardant, a flame resistant, an anti-drop agent, a weatherproof agent, an ultraviolet ray absorbent, an ultraviolet ray blocker, and a mixture thereof.

Advantageous Effects

According to the method for preparing a silicon polymer using non-transition-metal method of hydrosilylation, the method is economically feasible because conventional expensive platinum group catalysts such as platinum, palladium, rhodium, etc. are not used, and have an advantage that it is possible to prevent residues of heavy metal.

In addition, there are advantages in that the yield of hydrosilylation is high, the reactivity thereof is excellent, and it is possible to prepare environmentally friendly silicon polymers. Further, there is an advantage in that heating is not necessary, and therefore, production costs and energy costs related thereto can be reduced.

The environmentally friendly silicon polymer according to the present invention has an advantage in that the application thereof may be expanded to various technological fields due to the above described effects.

BEST MODE

Figure 1:
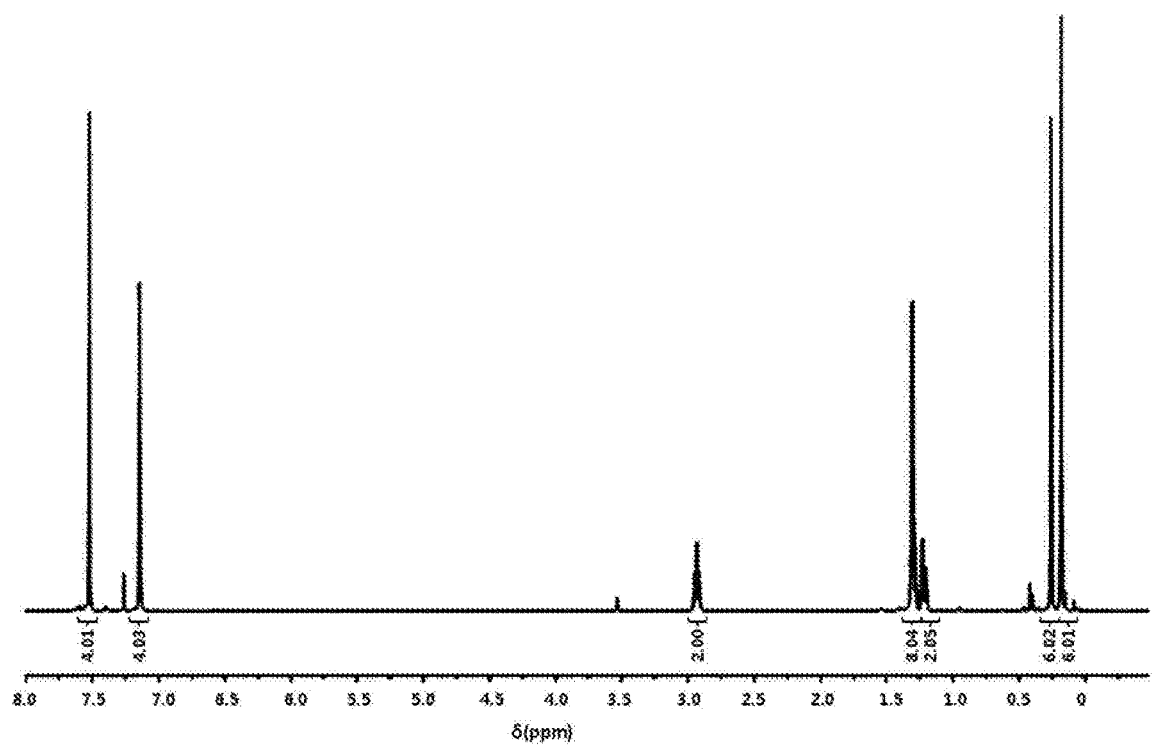
FIG. 1 is a $^1$H NMR (600 MHz, $CDCl_3$) measurement result of a silicon polymer prepared according to Example 1 of the present invention.

Hereinafter, preferred embodiments and a method of measuring physical properties for a method for preparing a silicon polymer using a non-transition-metal-catalyst method of hydrosilylation according to the present invention will be described in detail. The present invention can be better understood by the following examples, which are provided for the purpose of illustrating the present invention and which are not intended to limit the scope of protection limited by the appended claims.

The inventors of the present invention have conducted studies in order to develop a silicon polymer not using expensive platinum group catalysts, and as a result, the inventors discovered that it is possible to provide a method for preparing an environmentally friendly silicon polymer with excellent economic feasibility, no residual heavy metal, improved yield of hydrosilylation reaction, and excellent reactivity because of not using platinum group catalysts, by preparation by reacting a divinyl compound and a dihydrosilane compound under the presence of an organoboron catalyst in hydrosilylation, thereby completing the present invention.

Hereinafter, an embodiment of the present invention will be described in more detail.

The preparation method of the environmentally friendly silicon polymer according to an embodiment of the present invention includes subjecting a divinyl compound and a dihydrosilane compound to hydrosilylation under the presence of an organoboron catalyst.

The divinyl compound according to an embodiment of the present invention is a compound including at least two ethylene unsaturated groups and forms a crosslinked structure by cleaves the Si—H bond of the dihydrosilane compound and binding to a double bond of the divinyl compound under the presence of an organic boron catalyst.

The divinyl compound is not limited as long as it is a publicly disclosed compound in the art, and it can be represented by, for example, Chemical Formula 1 below.

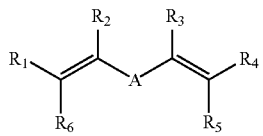

[Chemical Formula 1]

(in Chemical Formula 1 above, $R_1$ to $R_6$ are each independently selected from hydrogen and (C1-C10) alkyl, the A is selected from a chemical bond, oxygen, sulfur, carbonyl, (C1-C20) alkylene, (C2-C20) alkenylene, (C3-C20) cycloalkylene, (C6-C20) arylene, (C3-C20) heterocycloalkylene, (C4-C20) heteroarylene, and $(R_2SiO)_n$, the Rs are each independently selected from hydrogen or (C1-C10) alkyl, p is selected from 10 to 10,000, and the alkyl, alkylene, alkenylene, cycloalkylene, arylene, heterocycloalkylene, and heteroarylene are substitutable with at least one selected from among (C1-C7) alkyl, halogen, nitro, cyano, hydroxyl, amino, (C6-C20) aryl, (C2-C7) alkenyl, (C3-C20) cycloalkyl, (C3-C20) heterocycloalkyl, and (C4-C20) heteroaryl).

The term "alkyl" as described in the present invention refers to a monovalent linear or branched saturated hydrocarbon radical consisting of carbon and hydrogen atoms, unless otherwise stated, and the term "alkylene" refers to a divalent linear or branched saturated hydrocarbon radical consisting of carbon and hydrogen atoms. Specific examples include, but are not limited to, methylene, ethylene, trimethylene, propylene, tetramethylene, pentamethylene, etc.

The term "(C2-C20) alkenylene" as described in the present invention refers to a divalent linear or branched unsaturated hydrocarbon radical containing one or more double bonds, unless otherwise stated. Specific examples include, but are not limited to, ethenylene, prophenylene, butenyl, and pentenylene, etc.

The term "(C3-C20) cycloalkylene" as described in the present invention refers to, unless otherwise stated, a divalent cyclic saturated hydrocarbon radical including a saturated monocyclic or saturated bicyclic ring structure of the number of carbon atoms of 3 to 20.

The term "(C6-C20) cycloalkylene" as described in the present invention refers to a divalent organic radical induced from aromatic hydrocarbons by the removal or two hydrogen atoms and includes a single or fused ring system including 4 to 7, preferably, 5 to 6 ring atoms in each ring. Specific examples include phenylene, naphthalene, biphenylene, etc., but not limited thereto.

The term "heterocycloalkylene" as described in the present invention refers to, unless otherwise stated, a divalent cycloalkylene radical including 1 to 3 hetero atoms selected from N, O, S as a saturated cyclic hydrocarbon skeleton atom, and the rest of saturated monocyclic or bicyclic ring skeleton atoms are carbon.

The term "(C4-C20) heteroarylene" as described in the present invention refers to, unless otherwise stated, a divalent aryl radical including 1 to 3 heteroatoms selected from N, O, S as aromatic ring skeleton atoms, and the rest of aromatic ring skeleton atoms are carbon.

Preferably, the divinyl compound can be represented by Chemical Formula 2 below.

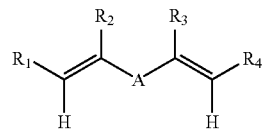

[Chemical Formula 2]

(in Chemical Formula 2 above, $R_1$, $R_2$, $R_3$, and $R_4$ are each independently selected from hydrogen and (C1-C5) alkyl, the A is selected from (C1-C10) alkylene, (C2-C10) alkenylene, (C3-C10) cycloalkylene, (C6-C10) arylene, and $(R_2SiO)_p$, the Rs are each independently selected from hydrogen or (C1-C10) alkyl, p is selected from 10 to 10,000, and the alkyl, alkylene, alkenylene, and cycloalkylene, and arylene are substitutable with at least one selected from among (C1-C7) alkyl, halogen, nitro, cyano, hydroxy, amino, (C6-C20) aryl, (C2-C7) alkenyl, and (C3-C20) cycloalkyl).

The divinyl compound according to an embodiment of the present invention may specifically be 1,4-diisopropenylbenzene, but not limited thereto.

The dihydrosilane compound according to an embodiment of the present invention is a compound including at least two or more Si—H groups, and binds with the double bond of the divinyl compound while cleaving the Si—H bond under the presence of an organic boron catalyst, in order to form a crosslinked structure.

The dihydrosilane compound according to an embodiment of the present invention is not limited as long as it is a publicly disclosed dihydrosilane compound in the art, and more specifically it can be represented by Chemical Formula 3 below.

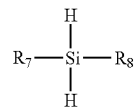

[Chemical Formula 3]

(in Chemical Formula 3 above, $R_7$ and $R_8$ are each independently selected from among hydrogen and (C1-C10) alkyl, (C2-C20) alkenyl, (C3-C20) cycloalkyl, (C6-C20) aryl, (C3-C20) heterocycloalkyl, (C4-C20) heteroaryl, —$OR_9$, —$N(R_{10})(R_{11})$, —$P(R_{12})(R_{13})(R_{14})$, and D-$Si(R_{15})(R_{16})(R_{17})$, not simultaneously hydrogen, the D is selected from oxygen, (C1-C20) alkylene, (C2-C20) alkenylene, (C3-C20) cycloalkylene, and (C6-C20) arylene, the $R_{15}$ to $R_{17}$ are each independently selected from among hydrogen, (C1-C10) alkyl, (C2-C20) alkenyl, (C3-C20) cycloalkyl, (C6-C20) aryl, (C3-C20) heterocycloalkyl, (C4-C20) heteroaryl, —$OR_{19}$, —$N(R_{20})(R_{21})$, and —$P(R_{22})(R_{23})(R_{24})$, the $R_9$ to $R_{14}$ and $R_{19}$ and $R_{24}$ are each independently hydrogen or (C1-C10) alkyl, and the alkylene, alkenylene, cycloalkylene, arylene, heterocycloalkylene and heteroarylene are substitutable with at least one selected from among (C1-C7) alkyl, halogen, nitro, cyano, hydroxy, amino, (C6-C20) aryl, (C2-C7) alkenyl, (C3-C20) cycloalkyl, (C3-C20) heterocycloalkyl and (C4-C20) heteroaryl).

More specifically, for the dihydrosilane compound according to an embodiment of the present invention, in Chemical Formula 3, $R_7$ to $R_{10}$ are each independently selected from hydrogen and (C1-C10) alkyl, not simultaneously hydrogen, the B is selected from (C1-C20) alkylene, (C2-C20) alkenylene, (C3-C20) cycloalkylene, and (C6-C20) arylene, the alkyl, alkylene, alkenylene, cycloalkylene, and arylene are substitutable with at least one selected from among (C1-C7) alkyl, halogen, nitro, cyano, hydroxy, amino, (C6-C20) aryl, (C2-C7) alkenyl, and (C3-C20) cycloalkyl, but not limited thereto.

According to an embodiment of the present invention, in the dihydrosilane compound in Chemical Formula 3 above, $R_7$ and $R_8$ are each independently selected from hydrogen, (C1-C10) alkyl, $-OR_9$, $-N(R_{10})(R_{11})$, $-P(R_{12})(R_3)(R_4)$, and $-D-Si(R_5)(R_{16})(R_{17})$, not simultaneously hydrogen, the D is selected from oxygen, (C1-C20) alkylene, (C2-C20) alkenylene, (C3-C20) cycloalkylene, and (C6-C20) arylene, the $R_{15}$ to $R_{17}$ are each independently selected from hydrogen, (C1-C10) alkyl, (C2-C20) alkenyl, (C3-C20) cycloalkyl, (C6-C20) aryl, (C3-C20) heterocycloalkyl, (C4-C20) heteroaryl, $-OR_{19}$, $-N(R_{20})(R_{21})$, and $-P(R_{22})(R_{23})(R_{24})$, the $R_9$ to $R_{14}$, and $R_{19}$ to $R_{24}$ are each independently hydrogen or (C1-C5) alkyl, and the alkyl, alkylene, alkenylene, cycloalkylene, and arylene are substitutable with at least one selected from (C1-C7) alkyl, halogen, nitro, cyano, hydroxy, amino, (C6-C20) aryl, (C2-C7) alkenyl, and (C3-C20) cycloalkyl.

More specifically, the dihydrosilane compound according to an embodiment of the present invention may be

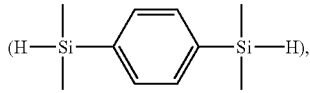

but not limited thereto.

According to an embodiment of the present invention, the contents of the divinyl compound and the dihydrosilane compound are not limited, but the molar ratio of the unsaturated group of the divinyl compound to the Si—H group of the dihydrosilane compound is preferably 40:60 to 60:40 to be mixed, and more preferably, when the molar ratio of the unsaturated group of the divinyl compound and the Si—H group of the dihydrosilane compound is 45:55 to 55:45 to be mixed, it is possible to form a uniform silicon polymer network structure, and therefore, it is effective.

According to an embodiment of the present invention, the compound represented by Chemical Formula 4 may be further included.

[Chemical Formula 4]

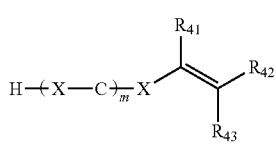

(in Chemical Formula 4 above, X is $-Si(R_{51})(R_{52})-$, the m is an integer selected from 0 to 100, the $R_{41}$ to $R_{43}$ and $R_{51}$ to $R_{52}$ are each independently selected from hydrogen, (C1-C10) alkyl, (C2-C20) alkenyl, (C3-C20) cycloalkyl, (C6-C20) aryl, (C3-C20) heterocycloalkyl, (C4-C20) heteroaryl, $-OR_{61}$, $-N(R_{62})(R_{63})$, and $-P(R_{64})(R_{65})(R_{66})$, not simultaneously hydrogen, the $R_{61}$ to $R_{66}$ are each independently hydrogen or (C1-C10) alkyl, the C is selected from a chemical bond, oxygen, sulfur, (C1-C20) alkylene, (C2-C20) alkenylene, (C3-C20) cycloalkylene, (C6-C20) arylene, (C3-C20) heterocycloalkylene, and (C4-C20) heteroarylene, and the alkyl, alkylene, alkenylene, cycloalkylene, and arylene are substitutable with at least one selected from (C1-C7) alkyl, halogen, nitro, cyano, hydroxy, amino, (C6-C20) aryl, (C2-C7) alkenyl, and (C3-C20) cycloalkyl).

In order to obtain a polymer having a high molecular weight by conventional step growth polymerization, it is crucial to introduce two monomers such that each reaction group in the two monomers has a molar ratio of 1:1. When compounds satisfying Chemical Formula 4 above are used, it is possible to always maintain the molar ratio between the reaction groups to be 1:1 because the two reaction groups are simultaneously included in one molecule. Therefore, it is more advantageous to obtain a resultant with a high molecular weight.

The organoboron catalyst according to an embodiment of the present invention can replace conventional platinum group metal-containing catalysts by catalyzing a hydrosilylation reaction.

Platinum group metal catalysts including ruthenium, rhodium, palladium, osmium, iridium, and platinum, which promote the conventional hydrosilylation reaction, are expensive and remain in the resin after polymerization. Therefore, there are problems such as elution of heavy metal, etc. depending on the applied products in order to conduct studies to solve these problems, by applying an organoboron catalyst, economic feasibility is improved compared to platinum group metal catalysts, and by preventing residual heavy metal and improving the yield of hydrosilylation reaction, it was found that the reactivity was also excellent.

The organoboron catalyst according to an embodiment of the present invention can be represented by Chemical Formula 5, but not limited thereto.

[Chemical Formula 5]

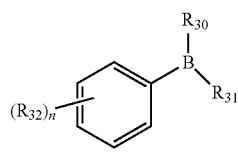

(in Chemical Formula 5 above, $R_{30}$ and $R_{31}$ are selected from halogen, (C1-C10) alkyl, (C3-C10) cycloalkyl, and (C6-C10) aryl, the $R_{32}$ is each independently selected from hydrogen, halogen, (C1-C10) alkyl, and (C6-C10) aryl, the alkyl, cycloalkyl, and aryl are substitutable with any one selected from (C1-C7) alkyl or halogen, and the n is an integer selected from 0 to 5, not simultaneously 0).

The organoboron catalyst according to an embodiment of the present invention can be represented by Chemical Formula 6, but not limited thereto.

[Chemical Formula 6]

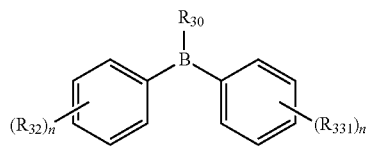

(in Chemical Formula 6, $R_{30}$ is selected from halogen, (C1-C10) alkyl, (C3-C10) cycloalkyl, and (C6-C10) aryl, the $R_{32}$ and $R_{331}$ are each independently selected from hydrogen, halogen, (C1-C10) alkyl, and (C6-C10) aryl, and the alkyl, cycloalkyl, and aryl are substitutable with at least one selected from (C1-C7) alkyl or halogen, and the n is an integer selected from 0 to 5, not simultaneously 0).

According to an embodiment of the present invention, the organoboron catalyst can be represented by Chemical Formula 7, but not limited thereto.

[Chemical Formula 7]

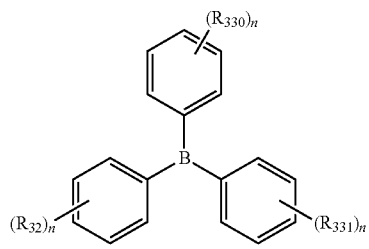

(in Chemical Formula 7 above, the $R_{32}$, $R_{330}$, and $R_{331}$ are each independently selected from among hydrogen, halogen, (C1-C10) alkyl, and (C6-C10) aryl, the alkyl, cycloalkyl, and aryl are substitutable with any one selected from (C1-C7) alkyl or halogen, and the n is an integer selected from 0 to 5, not simultaneously 0).

More specifically, the organoboron catalyst can be selected from the compounds disclosed below, but not limited thereto.

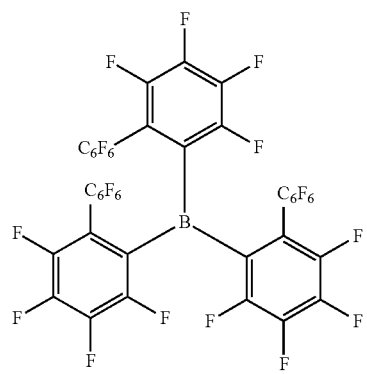

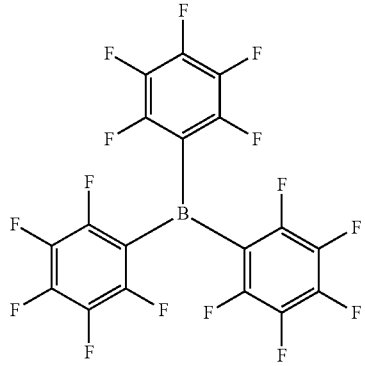

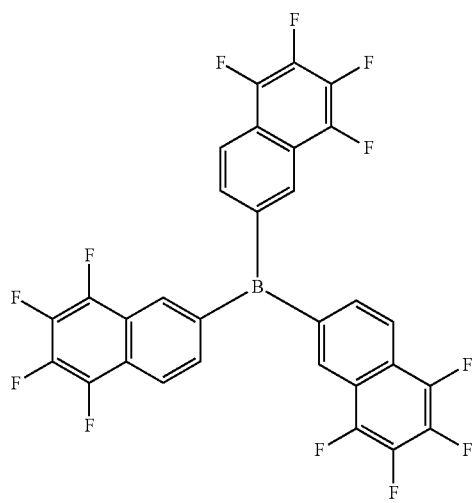

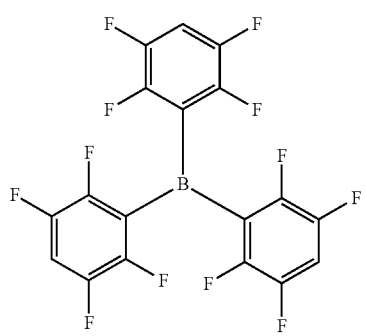

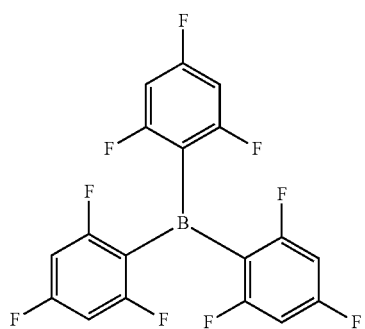

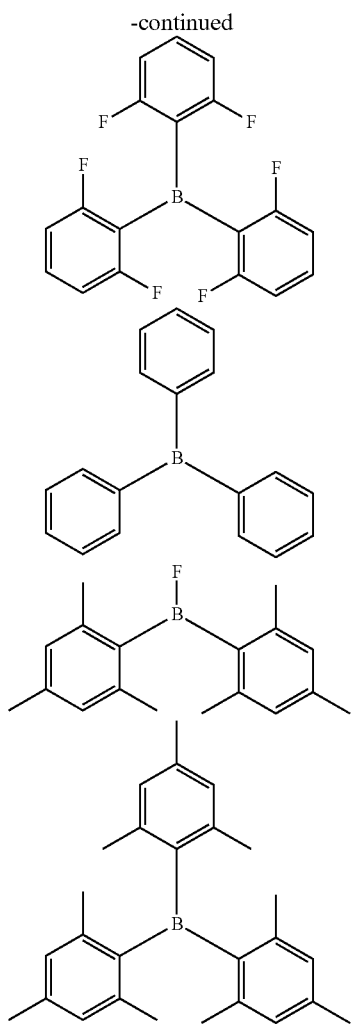

By including such an organic boron catalyst, it is possible to improve the economic efficiency and the heavy metal residue accompanying reduction of the raw material cost as compared with the case of using the existing platinum group metal catalyst, and at the same time, and the reactivity can be remarkably improved.

The amount of the organoboron catalyst according to an embodiment of the present invention is not limited as long as it can accelerate hydrosilylation. For example, the amount of the organoboron catalyst can be 0.01 to 10 mol % based on the amount of the divinyl compound, and preferably, be 0.1 to 5 mol %, and more preferably, 1 to 5 mol %. When the organoboron catalyst is included in the amount described above, it is effective because the reactivity of hydrosilylation and the reaction yield thereof can be significantly improved.

When the amount of the organoboron catalyst is below 0.01 mol %, hydrosilylation is not sufficiently accelerated so that the mechanical property and molecular weight of silicon polymers may be reduced, and when the amount thereof is above 10 mol %, the reactivity and the improvement of the yield are no longer enhanced, thereby causing a problem of an increase in unnecessary costs.

According to an embodiment of the present invention, the environmentally friendly silicon polymer can be prepared by reacting a catalyst solution including the organoboron catalyst and a mixture of the dihydrosilane compound, and the divinyl compound. The reaction temperature and reaction time can be selected within a range where hydrosilylation is accelerated and the properties of the prepared environmentally friendly silicon polymer are not deteriorated. For example, the polymer can be prepared by reacting at 20 to 40° C. for 12 to 48 hours, and more preferably, at 25 to 35° C. for 20 to 30 hours, but not limited thereto.

The catalyst solution can be prepared by mixing an organoboron catalyst and an organic solvent to improve reactivity and reaction yield. The organic solvent is not limited as long as the solvent is publicly disclosed, and for example, it can include chlorinated hydrocarbons, esters, ketones, alcohol aliphatic hydrocarbons, and aromatic hydrocarbons, but not limited thereto. The organic solvent can be more preferably chlorinated carbon, and specifically, methyl chloride, methylene chloride, and chloroform, as an example. Among these, using chloroform is most effective, but the present invention is not limited thereto.

According to another embodiment of the present invention, the present invention can provide an environmentally friendly silicon polymer prepared according to the preparation method of the environmentally friendly silicon polymer described above.

More specifically, the preparation method of the environmentally friendly silicon polymer according to an embodiment of the present invention does not include a platinum group catalyst, and the number average molecular weight can be, for example, 500 to 1,000,000 g/mol, but not limited thereto.

The environmentally friendly silicon polymer according to an embodiment of the present invention can further include an additive selected from the group consisting of an antimicrobial agent, a heat stabilizer, an antioxidant, a release agent, a photostabilizer, an inorganic additive, a surfactant, a coupling agent, a plasticizer, a compatibilizer, a lubricant, an antistatic agent, a colorant, a pigment, a dye, a flame retardant, a flame resistant, an anti-drop agent, a weatherproof agent, an ultraviolet ray absorbent, an ultraviolent ray blocker, and a mixture thereof.

For the environmentally friendly silicon polymer prepared according to the preparation method above, the types of the divinyl compound and the dihydrosilane compound can be changed according to the intended use, and accordingly, the molecular weight and chemical structure can be determined.

For example, the environmentally friendly silicon polymer as shown in Chemical Formula 8 below can be provided by applying the divinyl compound, the dihydrosilane compound, and the organoboron catalyst according to an embodiment of the present invention.

[Chemical Formula 8]

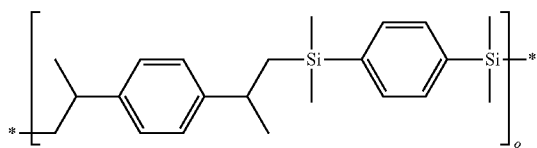

in Chemical Formula 8 above, o can be selected from 10 to 1,000).

The environmentally friendly silicon polymer prepared according to the preparation method of the present invention has a number average molecular weight of, for example, 5,000 to 200,000 g/mol, and more preferably, 10,000 to 100,000 g/mol, but not limited thereto.

The environmentally friendly silicon polymer thus prepared has a high yield for hydrosilylation, excellent reactivity, and there is an advantage in that an environmentally friendly silicon polymer can be prepared. In addition, since heating is not necessary, there is an advantage in that the production costs and energy costs related thereto can be reduced. Due to the effects described above, there is an advantage in that the environmentally friendly silicon polymer according to the present invention can be widely applied in various technological fields such as sealants, adhesives, silicone-based coating products, etc.

Hereinafter, the present invention will be described in more detail with reference to the following examples. However, the present invention is not limited to the following examples.

EXAMPLE 1

As shown in Table 1 below, under the nitrogen atmosphere, the dihydrosilane compound

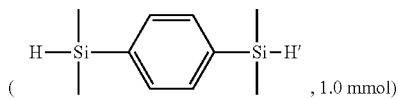

(, 1.0 mmol)

and the divinyl compound

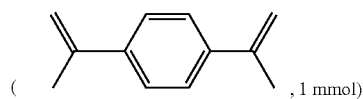

Figure 2:
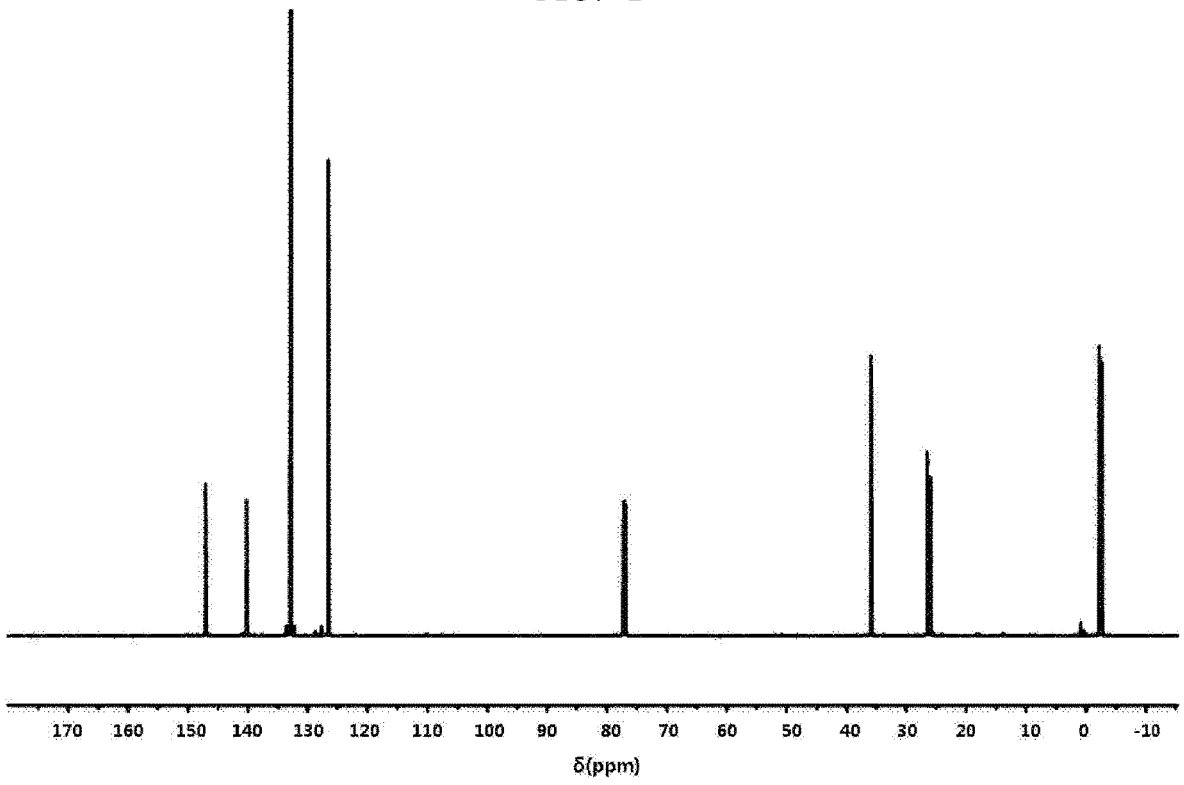
FIG. 2 is a $^{13}$C NMR (150 MHz, $CDCl_3$) measurement result of the silicon polymer prepared according to Example 1 of the present invention.
Figure 3:
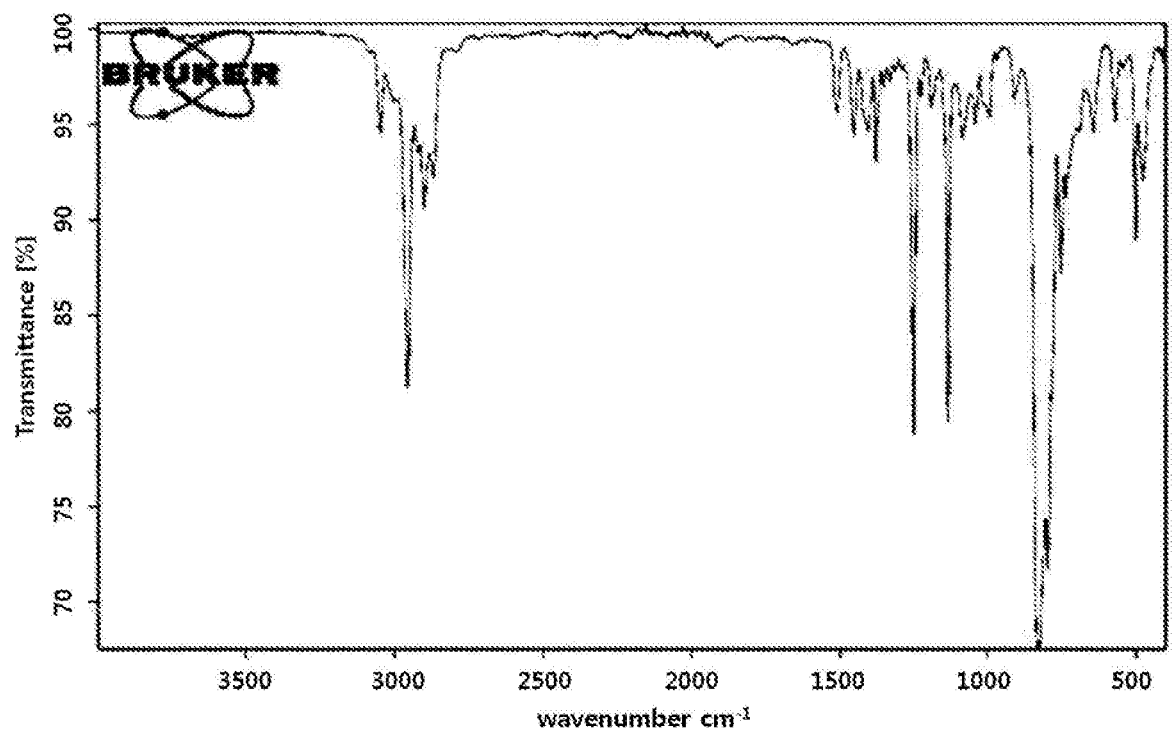
FIG. 3 is an FT-IR measurement result of the silicon polymer prepared according to Example 1 of the present invention.

(, 1 mmol)

were sequentially inserted into a mixture solution of the organoboron catalyst ($B(C_6F_5)_3$, 5 mol %, 0.05 mmol) and 0.4 mL of an organic solvent (chloroform). Afterwards, the mixture was stirred at room temperature for 24 hours and reacted. At the completion of the reaction, 10 mL of methanol was added to separate the formed precipitate, and the separated precipitate was dissolved in 3 mL of chloroform, then 10 mL of methanol was added to perform reprecipitation twice, in order to prepare 190 mg (reaction yield: 54%) of the final product. The number average molecular weight of the final product was measured using gel permeation chromatography (GPC) using a reference material for polystyrene, and the result thereof is shown in Table 1 below. In addition, the structure thereof was analyzed using $^1$H NMR, $^{13}$C NMR, and FT-IR, and each measurement result was shown in FIGS. 1 to 3.

EXAMPLES 2-4

As shown in Table 1 below, the final product was prepared in the same manner as in Example 1, except that the amount of the organoboron catalyst was changed. The physical properties of the final product were measured and shown in Table 1 below.

EXAMPLES 5-8

As shown in Table 1 below, the final product was prepared in the same manner as in Example 1, except that the amount of the dihydrosilane product was changed. The physical properties of the final product were measured and shown in Table 1 below.

COMPARATIVE EXAMPLE 1

As shown in Table 1 below, the final product was prepared in the same manner as in Example 1, except that a platinum group metal catalyst (Karstedt's catalyst, Platinum(0)-1,3-divinyl-1,1,3,3-tetramethyldisiloxane). The physical properties of the final product were measured and shown in Table 1 below.

COMPARATIVE EXAMPLE 2

As shown in Table 1 below, the final product was prepared in the same manner as in Example 1, except that a platinum group metal catalyst (Speier's catalyst, chloroplatinic acid hydrate). The physical properties of the final product were measured and shown in Table 1 below.

TABLE 1

| | Divinyl compound (mmol0) | Dihydrosilane compound (mmol) | Organoboron catalyst (mol %) | Platinum group metal catalyst (mol %) | Reaction hour (hr) | Reaction yield (%) | Number average molecular weight (Mn) | Molecular weight distribution |
|---|---|---|---|---|---|---|---|---|
| Example 1 | 1.0 | 1.0 | 5 | 0 | 24 | 54 | 14,100 | 1.90 |
| Example 2 | 1.0 | 1.0 | 1 | 0 | 24 | 54 | 11,700 | 2.00 |
| Example 3 | 1.0 | 1.0 | 3 | 0 | 24 | 54 | 13,400 | 2.01 |
| Example 4 | 1.0 | 1.0 | 10 | 0 | 24 | 50 | 14,100 | 1.88 |
| Example 5 | 1.0 | 0.9 | 5 | 0 | 24 | 28 | 7,500 | 1.88 |
| Example 6 | 1.0 | 0.98 | 5 | 0 | 24 | 49 | 13,300 | 1.89 |
| Example 7 | 1.0 | 1.05 | 5 | 0 | 24 | 54 | 8,900 | 1.77 |
| Example 8 | 1.0 | 1.1 | 5 | 0 | 24 | 49 | 6,400 | 1.61 |
| Comparative Example 1 | 1.0 | 1.0 | 0 | 5 | 24 | <5 | <500 | — |
| Comparative Example 2 | 1.0 | 1.0 | 0 | 5 | 24 | <5 | <500 | — |

Although the preferred embodiments of the present invention have been described above, it is apparent that the present invention can use various changes and equivalents, and that the embodiments can be appropriately modified and applied in a similar manner. Accordingly, the above description does not limit the scope of the present invention, which is determined by the limitations of the following claims.

The invention claimed is:
1. A method for preparing an environmentally friendly silicon polymer, wherein a divinyl compound and a dihydrosilane compound represented by Chemical Formula 3 or Chemical Formula 13 are subjected to a hydrosilylation reaction in the presence of an organoboron catalyst:

[Chemical Formula 3]

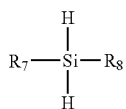

(in Chemical Formula 3, $R_7$ and $R_8$ are each independently selected from the group consisting of hydrogen, (C1-C10) alkyl, —$OR_9$, —$N(R_{10})(R_{11})$, —$P(R_{12})(R_{13})(R_{14})$, and -D-$Si(R_{15})(R_{16})(R_{17})$, not simultaneously hydrogen, the D) is selected from the group consisting of oxygen, (C1-C20) alkylene, (C3-C20) cycloalkylene, (C6-C20) arylene, (C3-C20) heterocycloalkylene, and (C4-C20) heteroarylene, the $R_{15}$ to $R_{17}$ are each independently selected from the group consisting of hydrogen, (C1-C10) alkyl, (C2-C20) alkenyl, (C3-C20) cycloalkyl, (C6-C20) aryl, (C3-C20) heterocycloalkyl, (C4-C20) heteroaryl, —$OR_{19}$, —$N(R_{20})(R_{21})$, and —$P(R_{22})(R_{23})(R_{24})$, the $R_9$ to $R_{14}$ and $R_{19}$ to $R_{24}$ are each independently hydrogen or (C1-C5) alkyl, and the alkyl, alkylene, alkenylene, cycloalkylene, and arylene are substitutable with at least one selected from the group consisting of (C1-C7) alkyl, halogen, nitro, cyano, hydroxyl, amino, (C6-C20) aryl, (C2-C7) alkenyl, and (C3-C20) cycloalkyl)

[Chemical Formula 13]

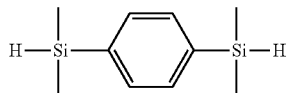

2. The method of claim 1, wherein the divinyl compound is represented by Chemical Formula 1 below:

[Chemical Formula 1]

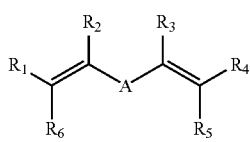

(in Chemical Formula 1 above, $R_1$ to $R_6$ are each independently selected from the group consisting of hydrogen and (C1-C10) alkyl, the A is selected from the group consisting of a chemical bond, oxygen, sulfur, carbonyl, (C1-C20) alkylene, (C2-C20) alkenylene, (C3-C20) cycloalkylene, (C6-C20) arylene, (C3-C20) heterocycloalkylene, (C4-C20) heteroarylene and $(R_2SiO)_n$, the Rs in the $(R_2SiO)_n$ are each independently selected from hydrogen or (C1-C10) alkyl, n is selected from 10 to 10,000, and the alkyl, alkylene, alkenylene, cycloalkylene, arylene, heterocycloalkylene and heteroarylene are substitutable with at least one selected from the group consisting of (C1-C7) alkyl, halogen, nitro, cyano, hydroxy, amino, (C6-C20) aryl, (C2-C7) alkenyl, (C3-C20) cycloalkyl, (C3-C20) heterocycloalkyl and (C4-C20) heteroaryl).

3. The method of claim 2, wherein the divinyl compound is represented by Chemical Formula 2 below:

[Chemical Formula 2]

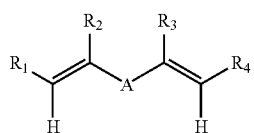

(in Chemical Formula 2 above, $R_1$, $R_2$, $R_3$ and $R_4$ are each independently selected from the group consisting of hydrogen and (C1-C5) alkyl, the A is selected from the group consisting of (C1-C10) alkylene, (C2-C10) alkenylene, (C3-C10) cycloalkylene, (C6-C10) arylene and $(R_2SiO)_p$, the Rs in the $(R_2SiO)_p$ are each independently selected from hydrogen or (C1-C10) alkyl, p is selected from 10 to 5,000, and the alkyl, alkylene, alkenylene, and cycloalkylene and arylene are substitutable with at least one selected from the group consisting of (C1-C7) alkyl, halogen, nitro, cyano, hydroxy, amino, ((C6-C20) aryl, (C2-C7) alkenyl and (C3-C20) cycloalkyl).

4. The method of claim 1, wherein an unsaturated group of the dinvinyl compound and a Si—H group of the dihydrosilane compound are included at a molar ratio of 40:60 to 60:40, and the organoboron catalyst is included at an amount of 0.01 to 10 mol % based on the divinyl compound.

5. The method of claim 1, wherein the organoboron catalyst is represented by Chemical Formula 5 below:

[Chemical Formula 5]

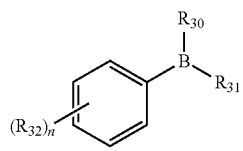

(in Chemical Formula 5, $R_{30}$ and $R_{31}$ are each independently selected from the group consisting of halogen, (C1-C10) alkyl, (C3-C10) cycloalkyl and (C6-C10) aryl, the $R_{32}$ is each independently selected from the group consisting of hydrogen, halogen, (C1-C10) alkyl, and (C6-C10) aryl, the alkyl, cycloalkyl, and aryl are substitutable with any one selected from (C1-C7) alkyl or halogen, and the n is an integer selected from 0 to 5).

6. The method of claim 5, wherein the organoboron catalyst is represented by Chemical Formula 6 below:

[Chemical Formula 6]

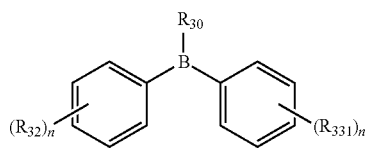

(in Chemical Formula 6 above, $R_{30}$ is selected from the group consisting of halogen, (C1-C10) alkyl, (C3-C10) cycloalkyl, and (C6-C10) aryl, the $R_{32}$ to $R_{331}$ are each independently selected from the group consisting of hydrogen, halogen, (C1-C10) alkyl, and (C6-C0) aryl, the alkyl, cycloalkyl, and aryl are substitutable with at least one selected from (C1-C7) alkyl or halogen, and the n is an integer selected from 0 to 5, not simultaneously 0).

7. The method of claim 6, wherein the organoboron catalyst is represented by Chemical Formula 7 below:

[Chemical Formula 7]

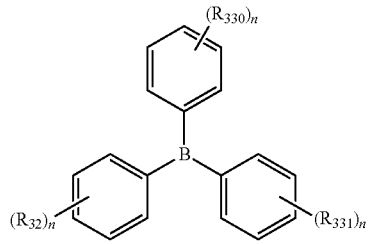

(in Chemical Formula 7 above, the $R_{32}$, $R_{330}$, and $R_{331}$ are each independently selected from the group consisting of hydrogen, halogen, (C1-C10) alkyl, and (C6-C10) aryl, the alkyl, cycloalkyl, and aryl are substitutable with at least one selected from the group consisting of (C1-C7) alkyl or halogen, and the n is an integer selected from 0 to 5, not simultaneously 0).

8. The method of claim 1, wherein the method comprises:

mixing a catalyst solution including the organoboron catalyst, the dihydrosilane compound, and the divinyl compound, and reacting the resultant mixture at 20 to 40° C. for 12 to 48 hours.

* * * * *